United States Patent
Oliver et al.

(10) Patent No.: US 10,819,860 B1
(45) Date of Patent: *Oct. 27, 2020

(54) CHARGING AND COLLECTION FUNCTION IN MICROSERVICES

(71) Applicant: AT&T Intellectual Property I, L.P., Atlanta, GA (US)

(72) Inventors: James Edward Oliver, Alabaster, AL (US); Ming Mei Lee, Morganville, NJ (US); Debra Sparks, Birmingham, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,008

(22) Filed: May 26, 2020

Related U.S. Application Data

(63) Continuation of application No. 16/427,790, filed on May 31, 2019, now Pat. No. 10,701,215.

(51) Int. Cl.
*H04M 11/00* (2006.01)
*H04M 15/00* (2006.01)
*H04W 4/24* (2018.01)

(52) U.S. Cl.
CPC .......... *H04M 15/57* (2013.01); *H04M 15/31* (2013.01); *H04M 15/62* (2013.01); *H04M 15/63* (2013.01); *H04W 4/24* (2013.01); *H04M 2215/32* (2013.01)

(58) Field of Classification Search
CPC ...... H04M 11/00; H04M 15/00; H04M 15/30; H04M 15/31; H04W 4/24; H04W 28/20; H04W 76/27; H04W 76/28; H04W 8/24; H04W 80/02; H04L 12/66; H04L 65/1006; H04L 65/80; H04L 65/1016
USPC .......................... 455/406, 405; 1/1; 700/295
See application file for complete search history.

(56) References Cited

U.S. PATENT DOCUMENTS

| | | | |
|---|---|---|---|
| 10,248,465 B2 * | 4/2019 | Tanttu | G06F 9/5038 |
| 2009/0170469 A1 * | 7/2009 | Tuli | H04M 15/00 455/406 |
| 2009/0264097 A1 * | 10/2009 | Cai | G06Q 30/04 455/406 |
| 2010/0197268 A1 * | 8/2010 | Raleigh | H04M 15/80 455/408 |
| 2010/0205643 A1 * | 8/2010 | Raftelis | H04N 21/41407 725/110 |
| 2012/0059749 A1 * | 3/2012 | Sharma | G06Q 30/04 705/34 |
| 2012/0302208 A1 * | 11/2012 | Lovsen | H04W 4/24 455/406 |
| 2014/0058908 A1 * | 2/2014 | Gupta | G06Q 40/12 705/30 |

(Continued)

FOREIGN PATENT DOCUMENTS

| | | | |
|---|---|---|---|
| CN | 101309171 A | * | 11/2008 |
| CN | 101309171 A | | 11/2008 |

(Continued)

*Primary Examiner* — Mahendra R Patel
(74) *Attorney, Agent, or Firm* — BakerHostetler

(57) ABSTRACT

Various methods for a 3GPP defined Charging and Collection Function are employed that may use a microservices approach. The microservice approach may decompose the function of the network elements into component level functions that may be deployed as separate functional elements.

20 Claims, 8 Drawing Sheets

(56) References Cited

U.S. PATENT DOCUMENTS

| | | | | |
|---|---|---|---|---|
| 2014/0357219 A1 * | 12/2014 | Nicolaescu | ............ | H04M 15/41 455/406 |
| 2015/0189097 A1 * | 7/2015 | Sharma | ................ | H04M 15/65 370/259 |
| 2015/0271342 A1 * | 9/2015 | Gupta | .................. | H04M 15/60 455/406 |
| 2016/0057291 A1 * | 2/2016 | Iyer | ........................ | G06Q 30/04 455/406 |
| 2016/0142554 A1 * | 5/2016 | Anand | ................ | H04L 12/1403 455/406 |
| 2018/0182188 A1 * | 6/2018 | Luke | ........................ | B60L 53/11 |
| 2019/0215729 A1 * | 7/2019 | Oyman | ................... | H04L 65/80 |
| 2020/0236515 A1 * | 7/2020 | Zevallos | ............... | H04M 15/41 |

FOREIGN PATENT DOCUMENTS

| | | | | |
|---|---|---|---|---|
| CN | 103095498 | A | * | 5/2013 |
| KR | 2000-0039677 | A | | 7/2000 |
| KR | 20000039677 | A | * | 7/2000 |
| KR | 2001-0004867 | A | | 1/2001 |
| KR | 20010004867 | A | * | 1/2001 |
| KR | 10-0328441 | B1 | | 2/2002 |
| KR | 100328441 | B1 | * | 2/2002 |
| KR | 10-0730823 | B1 | | 6/2007 |
| KR | 100730823 | B1 | * | 6/2007 |
| WO | WO 2002/096086 | A2 | | 11/2002 |
| WO | WO-02096086 | A2 | * | 11/2002 ........ H04M 15/8044 |

\* cited by examiner

CHARGING AND COLLECTION FUNCTION IN MICROSERVICES

CROSS REFERENCE TO RELATED APPLICATIONS

This application is a continuation of, and claims priority to, U.S. patent application Ser. No. 16/427,790, filed May 31, 2019, entitled "Charging And Collection Function In Microservices," the entire contents of which are hereby incorporated herein by reference.

BACKGROUND

The 3rd Generation Partnership Project (3GPP) standard defines the Charging and Collection Function (CCF) where it consists of two main components—Charging Data Function (CDF) and Charging Gateway Function (CGF). The CDF has the responsibility of receiving charging data from network elements that are involved in session flows for session initiation protocol (SIP) based services, and those network elements may be referred to as Charging Trigger Functions (CTFs). CTFs send charging data in the form of Diameter messages to the CCF. The CDF uses the provided charging data to generate charging data records (CDRs), and then delivers the CDRs to the CGF for placement in a file for collection and processing by Operational/Business Support Systems (OSS/BSS). The CDRs are used to meet various operational and business-related requirements. This disclosure is directed to addressing issues in the existing technology.

SUMMARY

Disclosed herein is a microservice based approach for implementing a defined charging and collection function. A computer-implemented system for implementing a microservice based defined charging and collection function may include: an operational support system or a business support system; a call processing element; a charging data record generation service that generates charging data records from charging data; a charging data record distribution service that generates charging data record files that include a plurality of charging data records; and a charging data collection service that collects charging data and distributes charging data, wherein the charging data collection service executes operations comprising: obtaining the charging data from the call processing element; and sending the charging data to the operational support system or business support system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
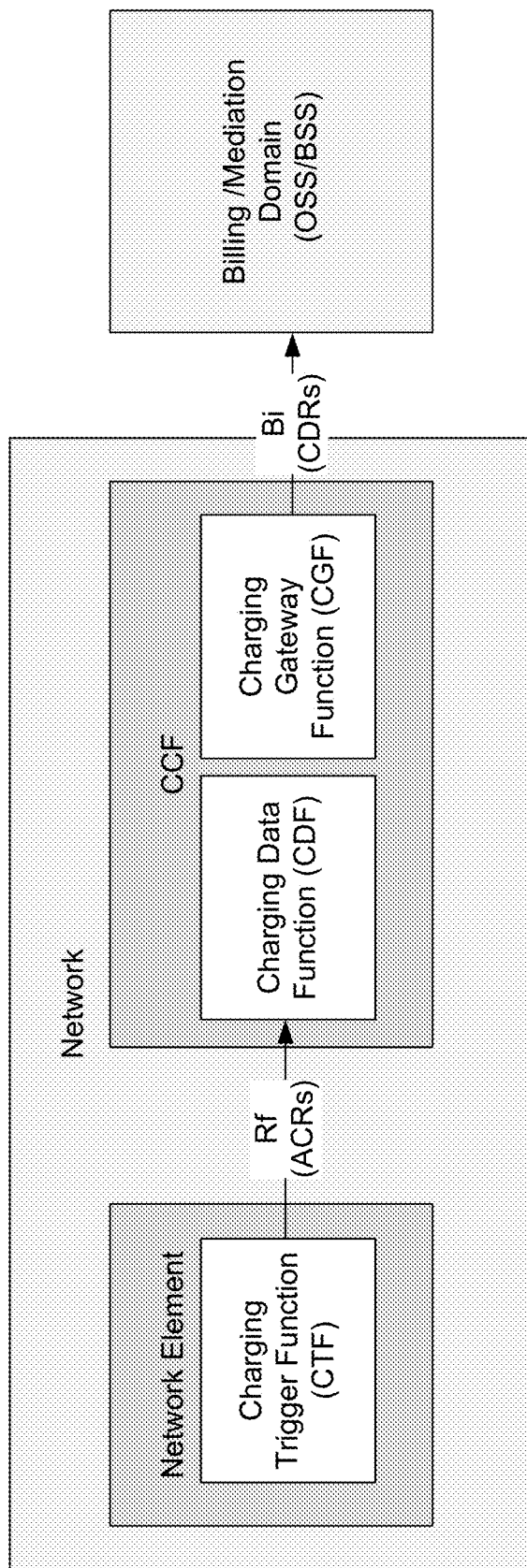
FIG. 1 illustrates conventional 3GPP offline charging.
Figure 2:
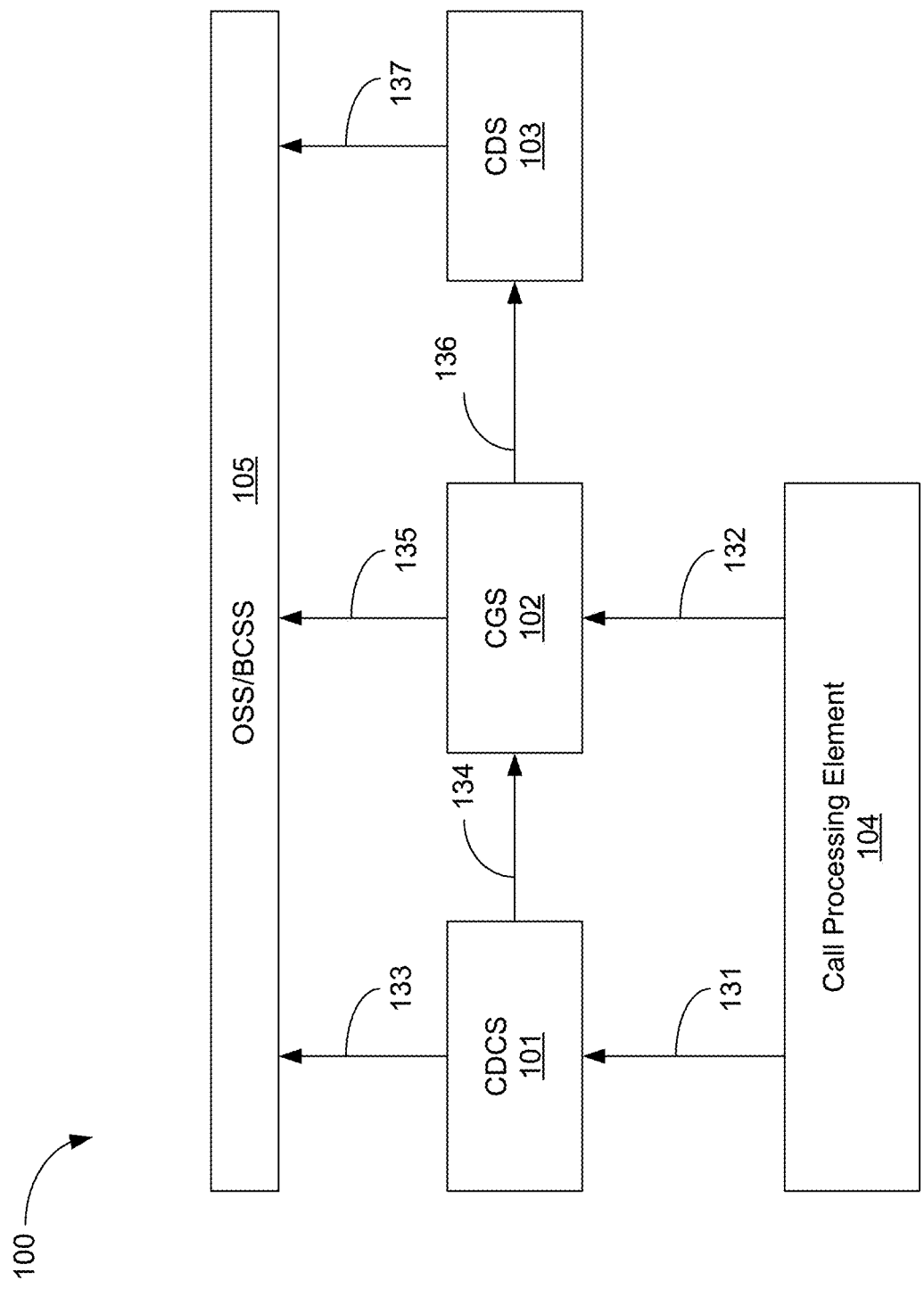
FIG. 2 illustrates an exemplary system for executing microservice charging and collection functions.

FIG. 1 illustrates a conventional data flow from the CTF to the CCF and eventually to the OSS/BSS. Conventional implementations, even those that are virtualized to run in a cloud environment, present challenges in life cycle management of the CCF because the non-decomposed CCF must be treated as a monolithic element with tightly linked components that are not easily managed, even in a cloud environment. Disclosed herein the CCF may be decomposed to individual discrete component functions that are loosely coupled with well-defined input and output flows, which may address challenges in conventional systems. Support of additional CCF data flows may be enabled or disabled via configuration. Discussed in more detail herein are modular applications, such as charging data collection service (CDCS), CDR generations services (CGS), and CDR distribution services (CDS), which may allow for additional data flows that may include output of charging data in real-time or output of individual CDRs in near-real time. FIG. 2 illustrates a general case of the architecture and FIG. 4 includes an architecture that may address redundancy.

FIG. 2 illustrates an exemplary system 100 for executing microservice charging and collection functions as disclosed herein. System 100 may include a call processing element 104, operational support system or a business support system (OSS/BSS) 105, charging data collection service (CDCS) 101, CDR generation service (CGS) 102, or CDR distribution service (CDS) 103. Call processing element 104 (e.g., CTF), OSS/BSS 105, CDCS 101, CGS 102, or CDS 103 may be communicatively connected with each other. The CTF is a network node which will generate charging events based on network resource consumption by a subscriber. Examples of network nodes which can contain a CTF include a service GPRS support nodes (SGSN), packet data network gateway (PGW), Evolved Packet Data Gateway (ePDG), IP Multimedia Subsystem (IMS) (e.g., Proxy-Call Session Control Function (P-CSCF), Service Centralization and Continuity Application Server (SCC AS), mobile telephony application server (MMTel-AS)), or the like.

With continued reference to FIG. 2, business support systems (BSS) are the components that a telecommunications service provider (or telco) uses to run its business operations towards customers. BSS may deal with taking of orders, payment issues, revenues, etc. BSS may support processes such as product management, order management, revenue management, or customer management. Operations Support Systems (OSS) may be used by telecommunications service providers to manage their networks (e.g., telephone networks). OSS may support management functions such as network inventory, service provisioning, network configuration, or fault management. BSS with the OSS may be used to support various end-to-end telecommunication services (e.g., telephone services).

Call processing element 104 may be an example CTF. There are network elements that are involved in the call setup and possibly the changes and tear down of a call. They receive signaling messages to establish, modify, and tear down calls. There can be multiple network elements in a call flow, and each network element has a role to fulfill within that particular call. In IMS, examples of call processing element 104 may include P-CSCF, Serving Call Session Control Function (S-CSCF), Emergency Call Session Control Function (E-CSCF), MMTel AS, Interconnection Border Control Function (IBCF), SCC-AS, etc. Each of these participate as call processing elements for various call types. More than one of the elements may be present in the call flow for individual calls.

CDCS 101 may collect charging data and distribute charging data. CDCS 101 may obtain charging data from a network device (e.g., call processing element 104). CDCS 101 supports obtaining charging data of different formats, such as accounting requests (ACRs), JavaScript Object Notation (JSON), Extensible Markup Language (XML), or simple delimited records, among other formats. CDCS 101 may output charging data to OSS/BSS 105 or CGS 102. Via path 133, CDCS 101 supports real-time delivery of charging data even before sessions are complete. Charging data may be call log data or session related errors for a given service or call processing element (e.g., IMS elements disclosed herein), or the like. The obtained charging data may be formatted as needed for the receiving downstream systems to appropriately process.

CGS 102 may generate charging data records from charging data. A Charging Data Record (CDR) is, in 3GPP parlance, a formatted collection of information about a chargeable telecommunication event (e.g., making a phone call or using the Internet from your mobile device). CDRs may be used for user billing: a telecom provider transfers them from time to time in order to send bills to their users. CDRs may be sent using the GTP' or FTP protocol. Information on chargeable events includes time of call set-up, duration of the call, amount of data transferred, etc. A separate CDR may be generated for each party to be charged. Entries on CDRs usually use a {category, usage} syntax. Usage units can be bits (e.g. user downloaded a 1 MB movie), seconds (e.g. user downloaded 1 minute of a movie), or other units (e.g. user downloaded 1 movie).

With continued reference to CGS 102 of FIG. 2, charging data may be obtained from call processing element 104 (thru path 132) or from CDCS 101 (thru path 131 and path 134). CGS 102 may be configured to accept different formats of charging data and appropriately reformat for OSS/BSS 105 (thru path 135) or CDS 102 (thru path 136). CGS 102 may generate individual CDRs from one or more charging data messages, which may support CDR file creation using CDS 102 (via path 136). Using the example above, CGS 102 may generate the P-CSCF CDR from the call detail data sent by the P-CSCF (e.g., in one or more ACRs). It may also apply the S-CSCF or MMTel AS case. Via path 135, CGS 102 supports real-time delivery of CDRs to OSS/BSS 105. CGS 102 may output CDRs in different formats based on certain factors, such as network performance indicators (e.g., utilization, delay, line errors, or device failures). In an example, network performance monitoring systems may prefer to receive complete CDRs (e.g., for successful/unsuccessful) sessions on a real-time basis to understand the network utilization from a session perspective. This would provide a view of high or low utilization in the network in a dynamic way. This understanding may be necessary to support automated deployment and provisioning where elements can be deployed or removed as needed. These network performance monitoring systems may only support the data in certain formats, e.g., ASN.1, JSON, XML, delimited, the conversion to any one of these formats can be controlled by configuration of CGS 102.

CDS 103 may generate charging data record files that include a plurality of charging data records. CDS 103 may obtain individual CDRs generated by CGS 102. CDS 103, via path 137, may send CDR files containing the generated charging data record files. CDS 103 may output CDR files in different formats (e.g., ASN.1, JSON or XML records, or delimited records) based on certain factors. For example, some OSS/BSS 105 may prefer the records to be in a clear text format, e.g. JSON, XML, delimited, so that it is easy to process. Others may have implemented the capability to process ASN.1, which is the standard format, and prefer to receive the data in ASN.1. The configuration of CDS 103 can accommodate each of these needs Discussed below provides an example scenario in the context of the disclosed subject matter. In an example, IMS user, Alice, calls another user, Bob. Alice is a Voice over LTE (VoLTE) subscriber. Example IMS network elements serving Alice are a P-CSCF, S-CSCF, and MMTel AS. Each of these elements are CTFs that interface with a CCF. When Alice places the call, signaling messages traverse the network elements above and cause the call detail data to be sent to the CCF. This data may be in the form of ACRs or other. For the P-CSCF, CDCS 101 in the CCF receives the call detail data from the P-CSCF and immediately forwards to the OSS/BSS for real-time analysis for operational purposes. CDCS 101 also sends the data to the CGS 102 for a CDR to be generated to support OSS/BSS systems that do not require real-time analysis and prefer to work with CDRs that cover an entire session. For the MMTel AS, CDCS 101 may only send the data to CGS 102 for CDR generation to support billing based on complete CDRs, i.e. real-time billing is not needed, and there is no real-time operational need. The configuration of CDCS 101 may control which output feeds it supports for a given data type/source.

Figure 3:
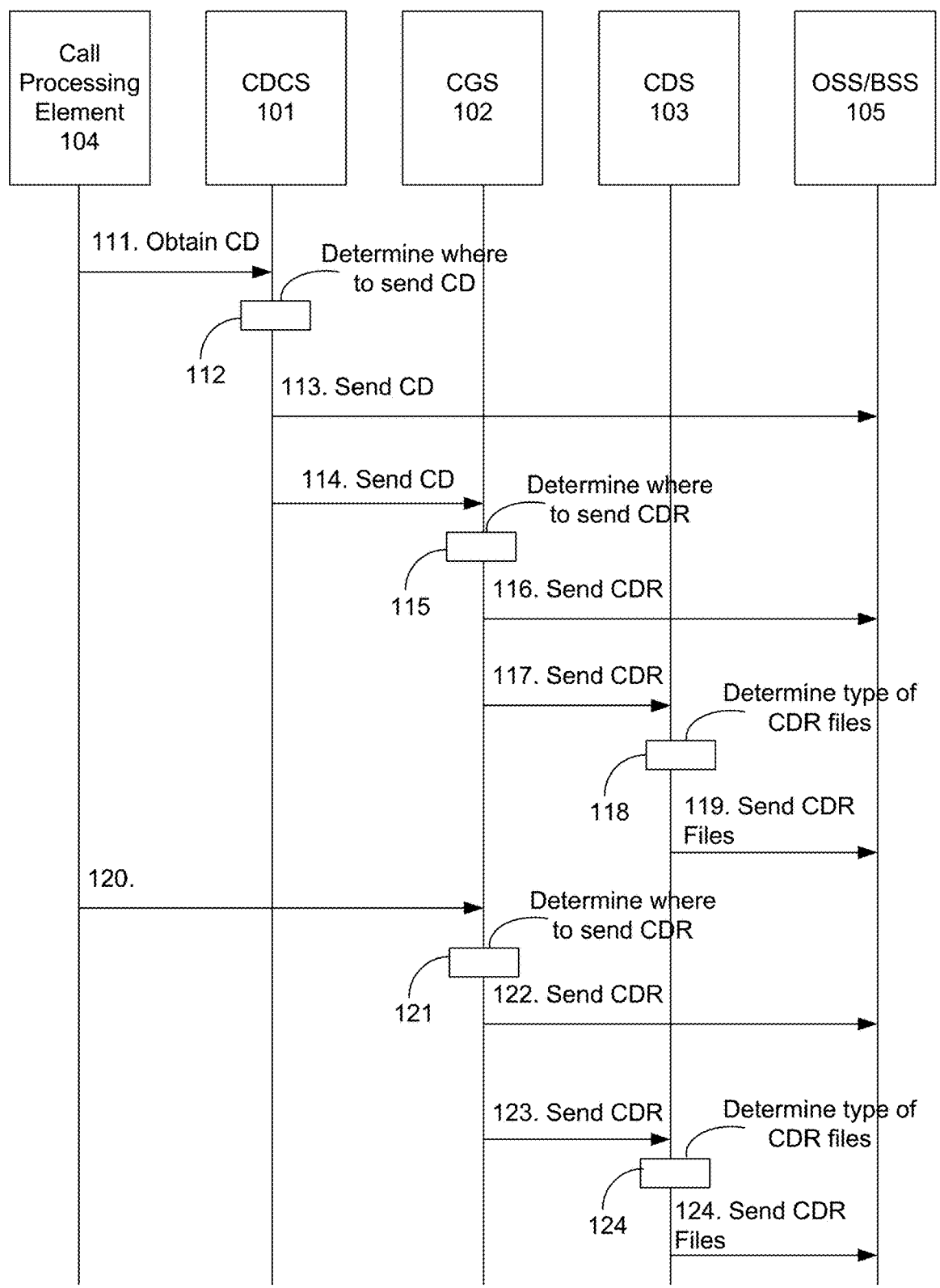
FIG. 3 illustrates an exemplary method flow for executing microservice charging and collection functions.

FIG. 3 illustrates an exemplary method flow for executing microservice charging and collection functions as disclosed herein. At step 111, call processing element 104 may send charging data to CDCS 101. Call processing element 101 may send the charging data to CDCS 101 instead of CGS 102 (described in more detail herein) based on indicated requirements from OSS/BSS 105. For example, OSS/BSS 105 may request real-time charging data before a session is completed based on different factors. For example, a downstream application uses the real-time data to give real-time feedback to users in making decisions in mobile phone use, service providers in network repair or to adjust to shape traffic through the network, or advertisers in making decisions (in real time) to advertise or adjust product availability while a user is using a mobile phone. Using the example session given above, the P-CSCF call detail data may be provided in real-time to support an operational need that uses the P-CSCF-provided data to quickly identify where problems are occurring. This changes recognition of a network problem from tens of minutes to potentially seconds. Again, may assist in identifying problems before they become outages so that they can be prevented. At step 112, CDCS 101 may determine whether to send charging data to OSS/BSS 105 (step 113) or CGS 102 (step 114) based on factors such as mobile device location, mobile device utilization threshold, or network traffic load of connection, among other things. Further CDCS may determine whether an application would need the data in real-time fashion. It is contemplated that step 113 and step 114 may occur at or about the same time (e.g., simultaneously). At step 113, CDCS 101 may send charging data to OSS/BSS 105. At step 114, CDCS 101 may send charging data to CGS 102.

With continued reference to FIG. 2, at step 115, CGS 102 may determine whether to send charging data reports to OSS/BSS 105 (step 116) or CDS 103 (step 117) based on factors as disclosed herein. OSS/BSS 105 may need real-time processing of completed CDRs or OSS/BSS 105 may prefer to process multiple completed CDRs in batch mode. Some OSS/BSS 105 may only want to see records after a session is ended, but desire the info as soon as possible without waiting for the records to be aggregated into a file. Once a CDR is generated, CGS 102 may immediately distribute to the OSS/BSS 105 domain as a single record or it may send to CDS 103 to be added to a file that will be collected by OSS/BSS 105 domain. If sent as a single record to OSS/BSS 105 domain, this could be done in the form of an HTTP post. This supports providing records (formatted as needed) for completed sessions in a more real-time manner without burdening OSS/BSS 105 with aggregating the real-time data, which may occur in steps 111-step 113 (e.g., path 131 and path 133). Aggregation and formatting may occur at CDCS 101 and CGS 102. It is contemplated that step 113 and step 116 may occur at or about the same time (e.g., path 131+path 133 and path 134+path 135). Therefore OSS/BSS 105 may receive the real-time (curing connection) charging data and near-real time (post connection) charging data. There may be a real-time feed of charging data and then after-call completion charging data record. Some OSS/BSS may want the data in real-time, but others are satisfied with receiving it in bulk. At step 116, CGS 102 may send charging data records to OSS/BSS 105. At step 117, CGS 102 may send charging data records to CDS 103. At step 118, CDS 103 may determine what type of CDR files to generate based on certain factors. For example, CDR files may be generated for call originating from a particular location (e.g., eNB, GPS coordinate, etc.) or CDR files may be generated based on type of mobile device generating a connection (e.g., tablet or mobile phone). At step 119, CDS 103 may send the CDR file of step 118 to OSS/BSS 105. It is contemplated that step 113, step 116, and step 119 may occur at or about the same time (e.g., path 131+path 133, path 134+path 135, and path 136+path 137). In addition, it is contemplated that step 111 and step 120 may occur at or about the same time.

At step 120, CGS 102 may obtain charging data directly from call processing element 104. At step 121, CGS 102 may determine whether to send charging data reports to OSS/BSS 105 (step 122) or CDS 103 (step 123) based on factors as disclosed herein. At step 122, CGS 102 may send charging data records to OSS/BSS 105. At step 123, CGS 102 may send charging data records to CDS 103. At step 124, CDS 103 may determine what type of CDR files to generate based on certain factors. For example, CDR files may be generated for call originating from a particular location (e.g., eNB, GPS coordinate, etc.) or CDR files may be generated based on type of mobile device generating a connection (e.g., tablet or mobile phone). At step 125, CDS 103 may send the CDR file of step 124 to OSS/BSS 105. It is contemplated that step 122 and step 125 may occur at or about the same time (e.g., path 132+path 135 and path 136+path 137).

Figure 4:
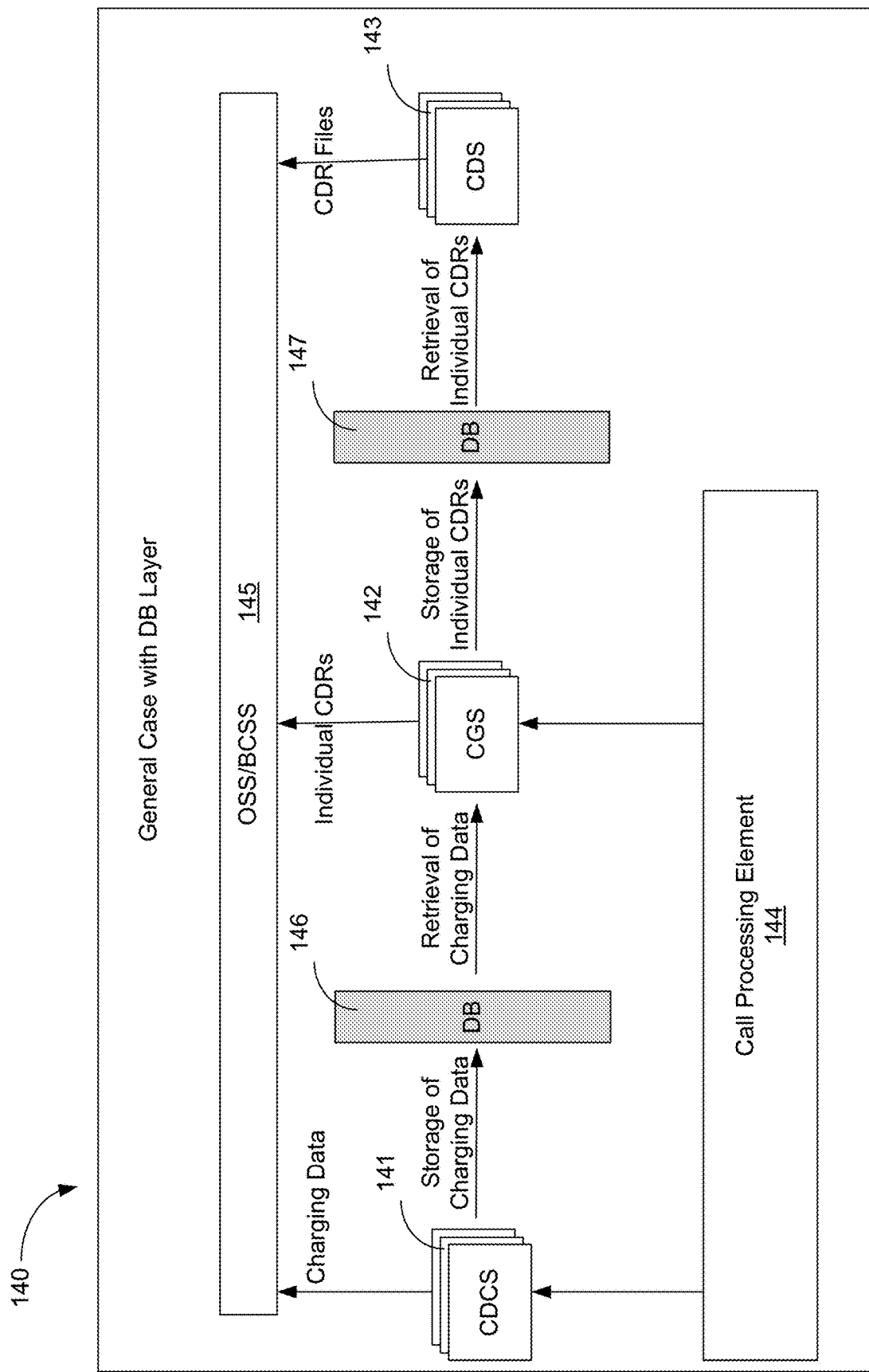
FIG. 4 illustrates an exemplary system for executing microservice charging and collection functions using a database layer.

FIG. 4 illustrates an exemplary system for executing microservice charging and collection functions using a database layer. Similar to FIG. 2, FIG. 4 includes CDCS 141, CGS 142, CDS 143, call processing element 144, and OSS/BSS 145. In addition, FIG. 4 may include database 146 and database 147. System 140 supports the above scenarios (e.g., FIG. 2-FIG. 3) and also provides a scalable solution where each component (CDCS, CGS, CDS) may be treated as separate pools. Multiple instances of each component may be implemented to provide some scalability. Failover between similar components may result in incomplete output unless database layer is used to capture data before or during failover. Individual components may be added-to or removed-from the pools without needing to reconfigure any other component in the adjacent pool.

Each CGS 142 may periodically retrieve a set of charging data from the charging data database 146 that is waiting to be processed. CDRs that are generated by CGSs 142 may be stored in the CDR database 147 where CDSs 143 may eventually retrieve and distribute to OSS/BSS 145. Once the CDR is successfully stored in CDR database 147, the associated charging data may be removed from charging data database 146.

In the event of a CGS 142 failure, data being processed by that CGS 147 at the time of the failure may still be available in charging data database 146 for other CGSs 147 to process if the failed CGS 147 does not recover within a defined period.

Each CDS 143 may periodically retrieve a set of CDRs from CDR database 147 for storing in a CDR file or sending as individual events to OSS/BSS 145. The CDR file, if generated, may be formatted per 3GPP standards and closed per defined criteria, e.g. file size limit, file open time, etc. Once a file is closed, it may be placed in a staging area awaiting collection by OSS/BSS 145, and once collected, the file may be archived for a defined period. CDR events may also be sent to OSS/BSS 145 via a standard protocol, e.g. HTTP, where each CDR is captured in a separate event. The staging area may be a file system that allows file collectors in the OSS/BSS domain to retrieve the files. Whether a CDR file or CDR event is used to convey the data to OSS/BSS domain 145 may be governed by the configuration of CDS 143 or CGS 142, as similarly disclosed herein with regard to FIG. 2 and FIG. 3. CDRs may be removed from CDR database 147 once they have been successfully staged in a file for collection or sent successfully as an event to OSS/BSS domain 145.

In the event of a CDS 143 failure, CDRs being processed by that CDS 143 at the time of the failure may still be available in CDR database 147 for other CDSs 143 to process if the failed CDS 143 does not recover within a defined period.

Databases (DB) may be used as a way to share the charging data or CDRs between microservice instances. The databases may be implemented separately, e.g. in a DB as a Service (DBaaS). The charging data (e.g., Diameter accounting requests (ACRs)) received by the CDCSs 141 from call processing element 144 may be inserted into charging data database 146, and CGSs 142 may retrieve that data to process into CDRs. The common charging data database 146 may allow for graceful handling of individual CGS 142 failures where the still active CGSs 142 have access to the data in the database, even data which was being worked by a failed CGS 142 just prior to failure and therefore did not complete. This architecture may reduce the possibility of producing incomplete CDRs.

CDR database 147 may be used for storing CDRs that have been generated by CGSs 142, and CDSs 143 may retrieve CDRs from CDR database 147 for distribution to OSS/BSS 145. That distribution may be in the form of a file containing multiple CDRs or as events where each event contains a single CDR. Use of a common CDR database 147 may protect against loss of CDRs if CDS 143 fails prior to successfully staging a CDR file for collection or sending as an event.

The microservice implementation increase isolation of fault risk and allow for more efficient dynamic scaling to meet changing business needs. The disclosed system 100 and system 140, from a fault management perspective, failures are confined to individual instances where the failure of one instance does not detrimentally affect other instances within the same pool unless the failure results in a significant capacity reduction to the point the remaining instances cannot handle the current load. Also, instance failures in a lower layer may have minimal impact instances in a higher layer, e.g. a CDCS failure may not impact the CGS layer. Tasks such as recovery from failure may be as simple as re-instantiation of a new instance of the failed service instance, e.g., CDCS 141, CGS 142, or CDS 143, without concern for the configuration of the other functioning instances. Time spent on troubleshooting and analysis may be reduced in most cases because it may be simpler and less time consuming to re-instantiate. The decision and execution of re-instantiation can be automated based on available fault data (e.g., SNMP traps/alarms).

The disclosed charging and collection microservice implementation may simplify growth and de-growth models and allows for capacity to be managed independently and dynamically within each pool. For example, CDCSs 141 may be added to the CDCS 141 pool to serve additional load from call processing element 144 without having to do anything to the configuration of the call processing element 144, CGSs 142, or CDSs 143. This can be accomplished a number of ways, such as 1) use a load balancer between the CTFs and the CDCS 141 pool, or 1) use simple DNS to implement a round-robin or weighted round-robin distribution of call detail data to CDCS 141. The example may be applicable to additions to CGS 142 and CDS 143 pools.

It is contemplated that the microservice (e.g., system 100) components may be implemented in all or in part using virtual machines, virtual network functions, or separate computing devices. Disclosed herein are various methods and systems that may use a microservices approach for a 3GPP defined charging and collection function. The microservice approach may decompose the function of the network elements into component level functions that may be deployed as separate functional elements.

Figure 5:
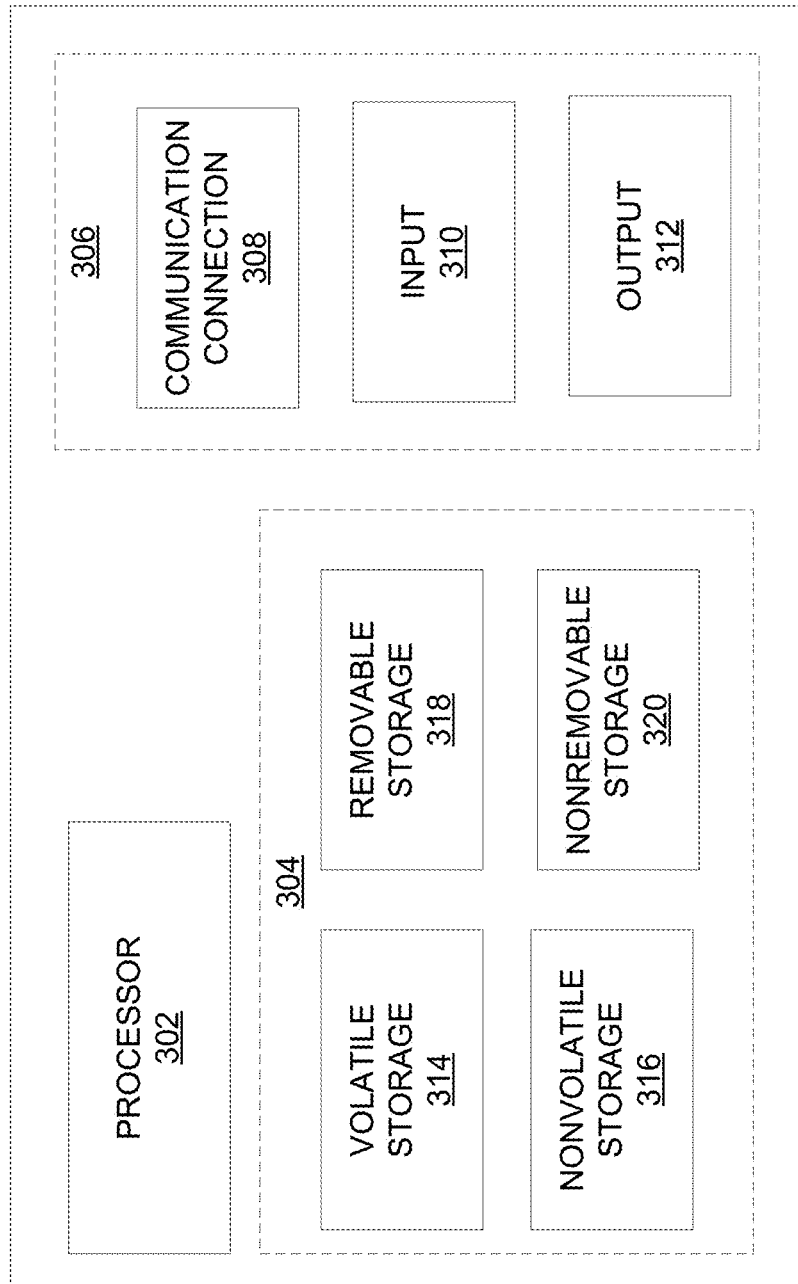
FIG. 5 illustrates a schematic of an exemplary network device.

FIG. 5 is a block diagram of network device 300 that may be connected to or comprise a component of system 100 or system 140. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
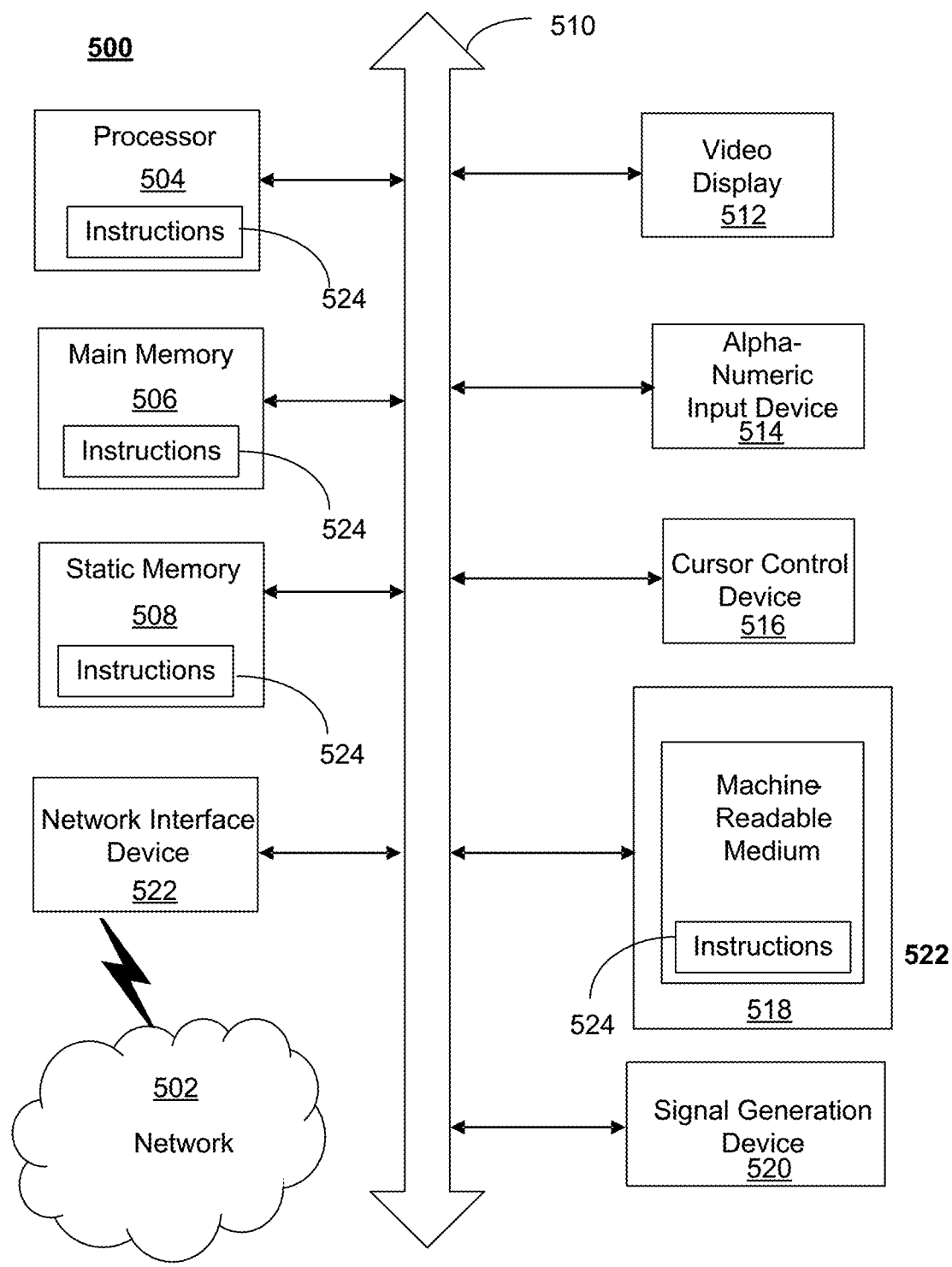
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above for charging and collection microservice. One or more instances of the machine can operate, for example, as processor 302, call processing element 104, CDCS 141, database 146, CGS 102, CDS 103, OSS/BSS 145, and other devices of FIG. 2 and FIG. 4. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7A:
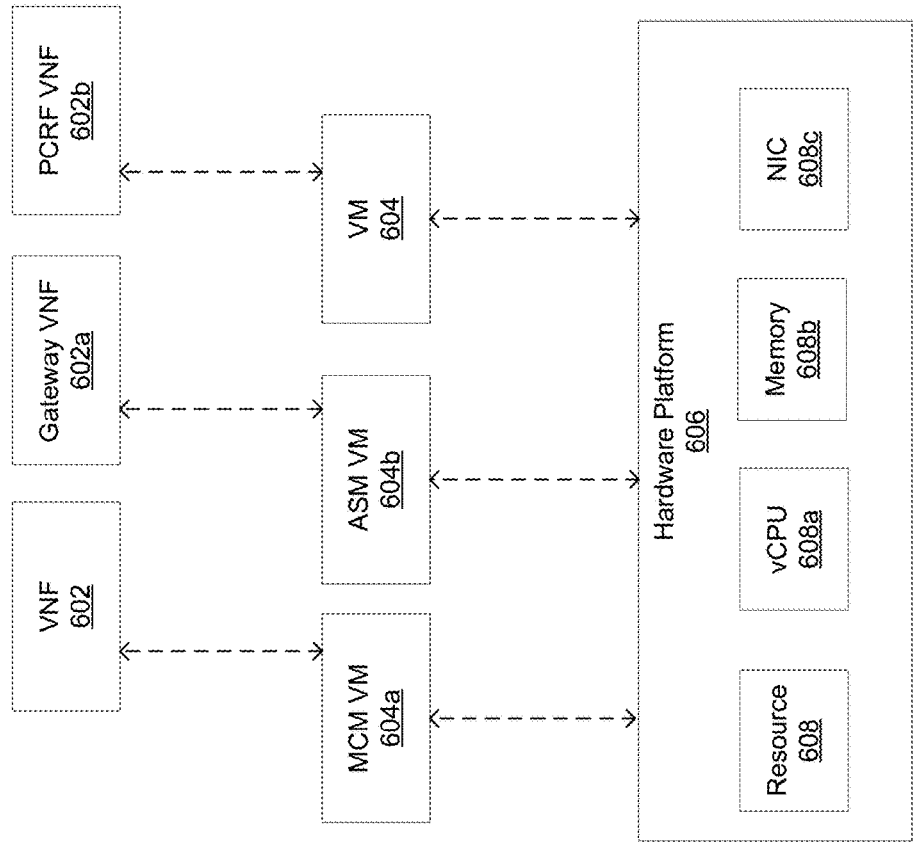
FIG. 7A is a representation of an exemplary network.

FIG. 7A is a representation of an exemplary network 600 that may incorporate charging and collection microservices. Network 600 may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 7A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 7A illustrates a management control module (MCM) VM 604a and an advanced services module (ASM) VM 604b. Additionally or alternatively, VMs 604 may include other types of VMs, such as a DEP VM (not shown). Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 7B:
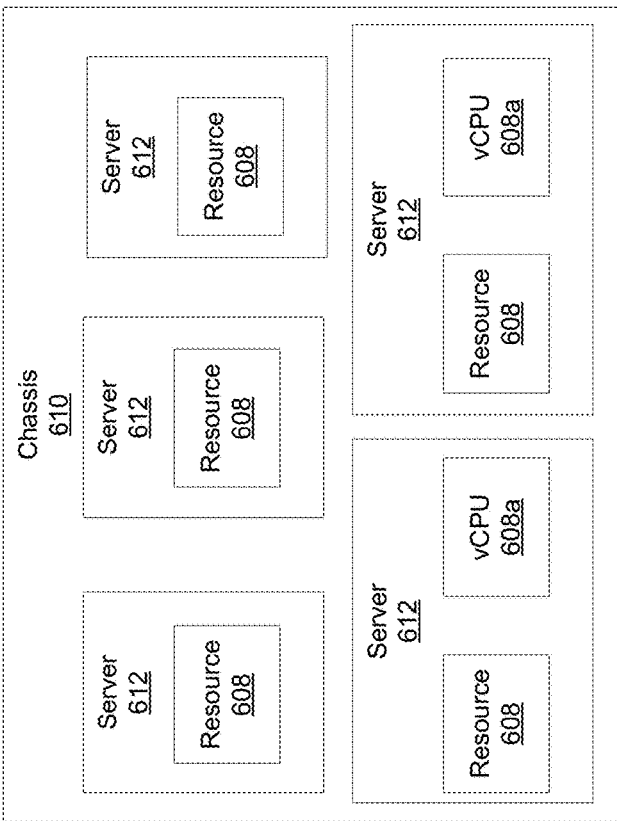
FIG. 7B is a representation of an exemplary hardware platform for a network.
Figure 7B:
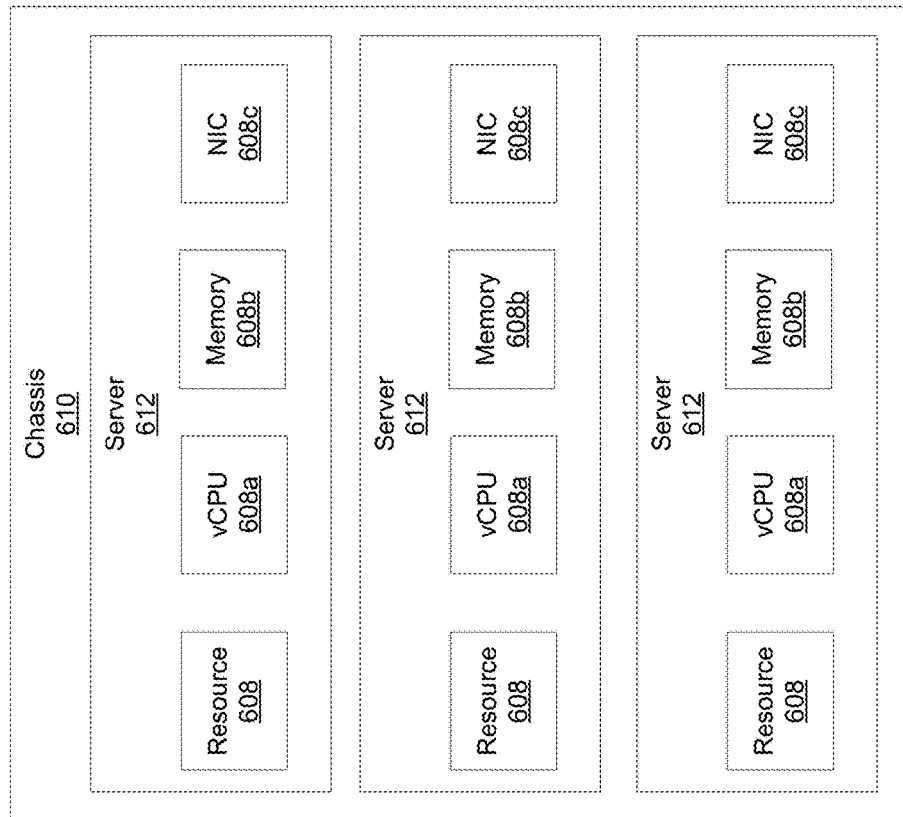

While FIG. 7A illustrates resources 608 as collectively contained in hardware platform 606, the configuration of hardware platform 606 may isolate, for example, certain memory 608c from other memory 608c. FIG. 7B provides an exemplary implementation of hardware platform 606.

Hardware platform 606 may comprise one or more chassis 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 7B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608*a*, 1 GB of memory 608*b*, and 2 NICs 608*c*, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604*a*, an affinity rule may dictate that those six MCM VMs 604*a* be instantiated on the same server 612 (or chassis 610). As another example, if VNF 602 uses MCM VMs 604*a*, ASM VMs 604*b*, and a third type of VMs 604, an affinity rule may dictate that at least the MCM VMs 604*a* and the ASM VMs 604*b* be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604*a* be instantiated on a particular server 612 that does not contain any ASM VMs 604*b*. As another example, an anti-affinity rule may require that MCM VMs 604*a* for a first VNF 602 be instantiated on a different server 612 (or chassis 610) than MCM VMs 604*a* for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602*a* and PCRF VNF 602*b*. Gateway VNF 602*a* may require five VMs 604 instantiated on the same server 612, and PCRF VNF 602*b* may require two VMs 604 instantiated on the same server 612. (Assume, for this example, that no affinity or anti-affinity rules restrict whether VMs 604 for PCRF VNF 602*b* may or must be instantiated on the same or different server 612 than VMs 604 for gateway VNF 602*a*.) In this example, each of two servers 612 may have enough resources 608 to support 10 VMs 604. To implement sessions using these two servers 612, first server 612 may be instantiated with 10 VMs 604 to support two instantiations of gateway VNF 602*a*, and second server 612 may be instantiated with 9 VMs: five VMs 604 to support one instantiation of gateway VNF 602*a* and four VMs 604 to support two instantiations of PCRF VNF 602*b*. This may leave the remaining resources 608 that could have supported the tenth VM 604 on second server 612 unused (and unusable for an instantiation of either a gateway VNF 602*a* or a PCRF VNF 602*b*). Alternatively, first server 612 may be instantiated with 10 VMs 604 for two instantiations of gateway VNF 602*a* and second server 612 may be instantiated with 10 VMs 604 for five instantiations of PCRF VNF 602*b*, using all available resources 608 to maximize the number of VMs 604 instantiated.

Consider, further, how many sessions each gateway VNF 602*a* and each PCRF VNF 602*b* may support. This may factor into which assignment of resources 608 is more efficient. For example, consider if each gateway VNF 602*a* supports two million sessions, and if each PCRF VNF 602*b* supports three million sessions. For the first configuration—three total gateway VNFs 602*a* (which satisfy the gateway requirement for six million sessions) and two total PCRF VNFs 602*b* (which satisfy the PCRF requirement for six million sessions)—would support a total of six million sessions. For the second configuration—two total gateway VNFs 602*a* (which satisfy the gateway requirement for four million sessions) and five total PCRF VNFs 602*b* (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which alerts associated with charging and collection microservices can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—charging and collection microservices—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Disclosed are methods, systems, or apparatus for a microservices based approach for implementing the 3GPP defined Charging and Collection Function. The disclosed methods, systems, or apparatus may enable the steps of FIG. 3. The system may include an operational support system or a business support system; a call processing element; a charging data record generation service that generates charging data records from charging data; a charging data record distribution service that generates charging data record files that include a plurality of charging data records; and a charging data collection service that collects charging data and distributes charging data, wherein the charging data collection service executes operations which may include: obtaining the charging data from the call processing element; and sending the charging data to the operational support system or business support system. The call processing element may execute operations comprising sending the charging data to the charging data collection service and the charging data record generation service at or about the same time (e.g., simultaneously. The call processing element may execute operations that include sending the charging data to the charging data record generation service based on being within a threshold time period or other factors disclosed herein. The sending of the charging data to the operational support system or business support system may be based on being within a threshold time period or other factors disclosed herein. The call processing element may be a charging triggering function of a packet data network gateway or another network device. The charging data record generation service and the charging data record distribution service may be virtual machines or virtual network functions. A charging trigger function can reside in more than a packet data network gateway; it can reside in a number of network elements in the packet core and IMS core. All combinations in this paragraph (including the removal or addition of steps) are contemplated in a manner that is consistent with the other portions of the detailed description.

What is claimed:

1. A system comprising:
   one or more processors; and
   memory coupled with the one or more processors, the memory storing executable instructions that when executed by the one or more processors cause the one or more processors to effectuate operations comprising:
   obtaining charging data from a call processing element, wherein the call processing element executes operations comprising sending the charging data to a charging data record generation service based on being within a threshold time period;
   determining that the charging data is within the threshold time period;
   based on the determining that the charging data is within the threshold time period, sending the charging data to an operational support system or a business support system for billing, wherein the operational support system comprises a fault management system, wherein the fault management system comprises configurations of failures into individual instances for analysis; and
   generating charging data records from the charging data.

2. The system of claim 1, wherein the system comprises a virtual network function or virtual machine.

3. The system of claim 1, the operations further comprising:
   decomposing functions associated with obtaining, determining, or sending charging data into component level functions; and
   deploying the decomposed functions as separate functional elements.

4. The system of claim 1, the operations further comprising:
   decomposing functions associated with obtaining, determining, or sending charging data into component level functions;
   deploying the decomposed functions as separate functional elements; and
   coupling the decomposed functions with defined input and output flows.

5. The system of claim 1, wherein the operational support system comprises a service provisioning system.

6. The system of claim 1, wherein the operational support system comprises a network inventory system.

7. The system of claim 1, wherein the operational support system comprises a network configuration system.

8. The system of claim 1, wherein the call processing element executes operations comprising sending the charging data to a charging data collection service and a charging data record generation service at the same time.

9. The system of claim 1, the operations further comprising:
   obtaining charging data records from a charging data record database, wherein the charging data record database is populated with the charging data records by the charging data record generation service;
   generating a charging data record file based on the charging data records; and
   sending the charging data record file to the operational support system or the business support system.

10. The system of claim 1, wherein the call processing element is a charging triggering function of a packet core.

11. A non-transitory computer readable storage medium storing computer executable instructions that when executed by a computing device cause said computing device to effectuate operations comprising:
    obtaining charging data from a call processing element, wherein the call processing element executes operations comprising sending the charging data to a charging data record generation service based on being within a threshold time period;
    determining that the charging data is within the threshold time period;
    based on the determining that the charging data is within the threshold time period, sending the charging data to an operational support system or a business support system for billing, wherein the operational support system comprises a fault management system, wherein the fault management system comprises configurations of failures into individual instances for analysis; and
    generating charging data records from the charging data.

12. The non-transitory computer readable storage medium of claim 11, the operations further comprising:
    decomposing functions associated with obtaining, determining, or sending charging data into component level functions; and
    deploying the decomposed functions as separate functional elements.

13. The non-transitory computer readable storage medium of claim 11, the operations further comprising:
    decomposing functions associated with obtaining, determining, or sending charging data into component level functions;
    deploying the decomposed functions as separate functional elements; and
    coupling the decomposed functions with defined input and output flows.

14. The non-transitory computer readable storage medium of claim 11, wherein the call processing element executes operations comprising sending the charging data to a charging data collection service and the charging data record generation service at the same time.

15. The non-transitory computer readable storage medium of claim 11, wherein the charging data record distribution service executes operations comprising:
    obtaining charging data records from a charging data record database, wherein the charging data record database is populated with the charging data records by the charging data record generation service;
    generating a charging data record file based on the charging data records; and
    sending the charging data record file to the operational support system or the business support system.

16. The non-transitory computer readable storage medium of claim 11, wherein the call processing element is a charging triggering function of a packet core.

17. A method comprising:
    obtaining, by a processor, charging data from a call processing element, wherein the call processing element executes operations comprising sending the charging data to a charging data record generation service based on being within a threshold time period;

determining, by the processor, that the charging data is within a threshold time period;

based on the determining that the charging data is within the threshold time period, sending, by the processor, the charging data to an operational support system or a business support system for billing, wherein the operational support system comprises a fault management system, wherein the fault management system comprises configurations of failures into individual instances for analysis; and generating, by the processor, charging data records from the charging data.

18. The method of claim 17, further comprising:

decomposing functions associated with obtaining, determining, or sending charging data into component level functions; and deploying the decomposed functions as separate functional elements.

19. The method of claim 17, wherein the call processing element executes operations comprising sending the charging data to the charging data collection service and the charging data record generation service at the same time.

20. The method of claim 17, wherein the charging data record distribution service executes operations comprising:

obtaining charging data records from a charging data record database, wherein the charging data record database is populated with the charging data records by the charging data record generation service;

generating a charging data record file based on the charging data records; and sending the charging data record file to the operational support system or the business support system.

* * * * *